April 12, 1938.   H. R. RICARDO   2,113,711
INTERNAL COMBUSTION ENGINE OF THE LIQUID FUEL
INJECTION COMPRESSION IGNITION TYPE
Filed May 29, 1935   3 Sheets-Sheet 1

INVENTOR
Harry Ralph Ricardo,
BY
Watson, Cole-Grove & Grindle
ATTORNEY

April 12, 1938. H. R. RICARDO 2,113,711
INTERNAL COMBUSTION ENGINE OF THE LIQUID FUEL
INJECTION COMPRESSION IGNITION TYPE
Filed May 29, 1935 3 Sheets-Sheet 2
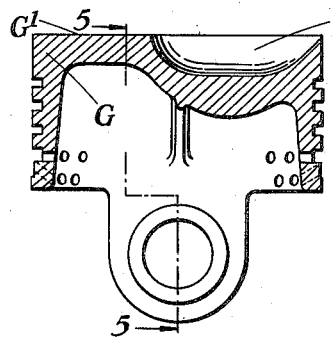
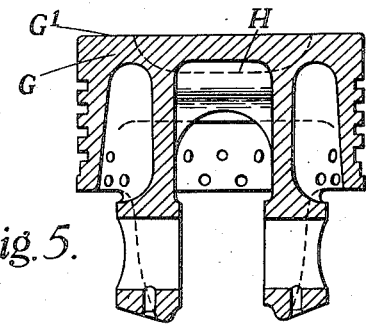
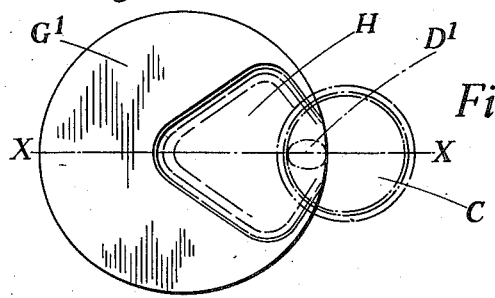
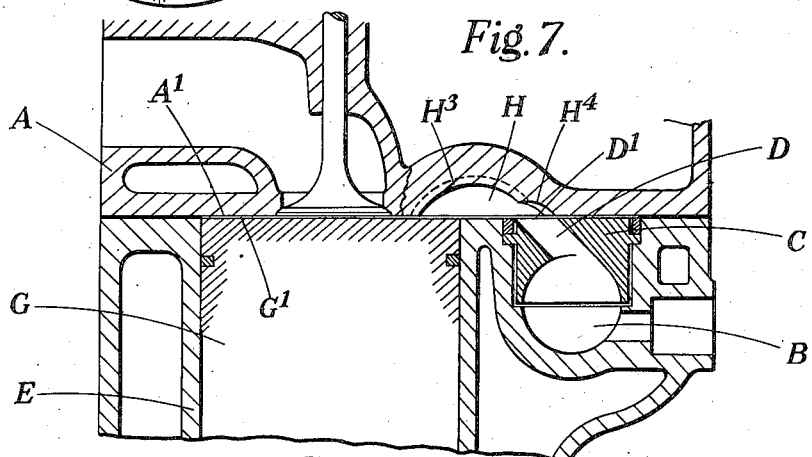
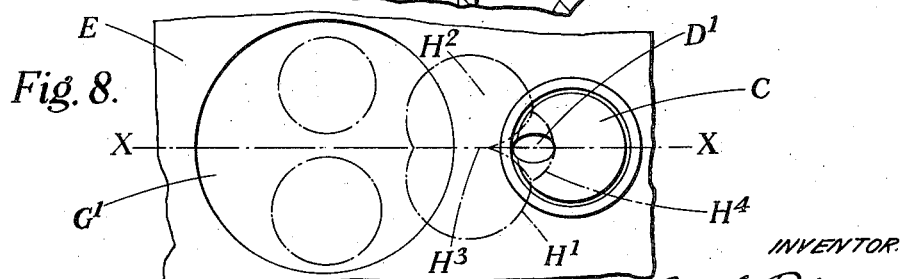
INVENTOR.
Harry Ralph Ricardo,
BY
Watson, Cole-Morse & Grindle
ATTORNEY April 12, 1938. H. R. RICARDO 2,113,711
INTERNAL COMBUSTION ENGINE OF THE LIQUID FUEL
INJECTION COMPRESSION IGNITION TYPE
Filed May 29, 1935 3 Sheets-Sheet 3
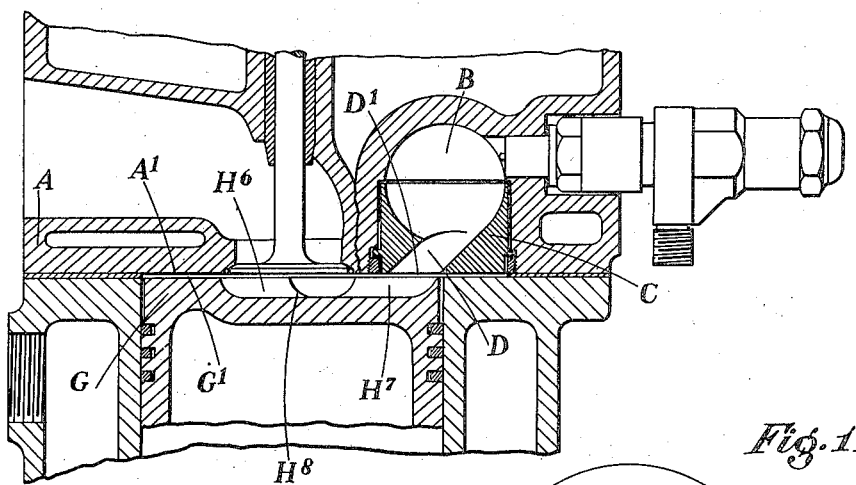
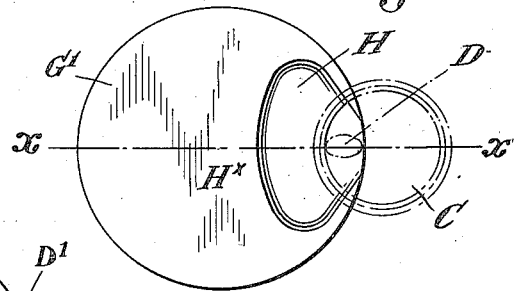
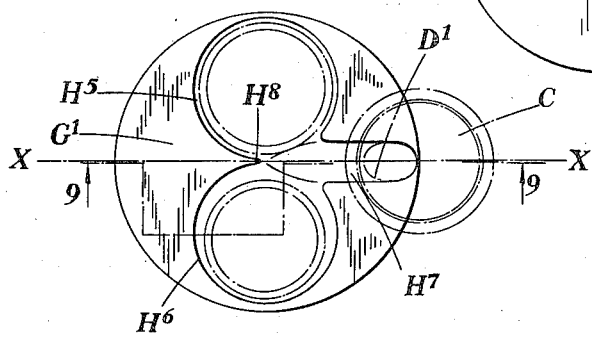
INVENTOR
Harry Ralph Ricardo,
BY
ATTORNEY Patented Apr. 12, 1938

2,113,711

UNITED STATES PATENT OFFICE 2,113,711

INTERNAL COMBUSTION ENGINE OF THE LIQUID FUEL INJECTION COMPRESSION IGNITION TYPE

Harry Ralph Ricardo, London, England

Application May 29, 1935, Serial No. 24,145
In Great Britain June 6, 1934

4 Claims. (Cl. 123—32)

This invention relates to internal combustion engines of the liquid fuel injection compression ignition type. The invention relates particularly to an engine of this general type in which there is a combustion chamber external to the cylinder formed as a cooled pocket in whose mouth, which opens into the end of the cylinder, is a plug-like member of substantial thickness mounted so that the heat flow therefrom to the parts surrounding it is restricted, that is to say there is no free flow of heat from the plug member, there being through this plug a passageway so formed and arranged that at the end of the compression stroke the air charge which is then forced into the combustion chamber will rotate or circulate in an organized manner within that chamber.

An engine embodying these features is described in the specification of the present inventor's United States of America application Ser. No. 574,885, now Patent No. 2,003,311, but in that construction at the end of the compression stroke the clearance between the whole face of the piston and the whole end of the cylinder is so reduced that at the end of the compression stroke substantially the whole of the air charge is then forced into and contained in the passageway and the external combustion chamber In an engine of the above-mentioned type as modified and constructed in accordance with this invention, at the end of the compression stroke not more than 50% of the total volume of the combustion space is constituted by the chamber or pocket, which lies outside the cylinder, together with the passageway through the plug member disposed in the mouth of this chamber, the remainder of the combustion space being constituted by the space between the face of the piston and the end of the cylinder which space is increased locally adjacent to the orifice of the passageway through the plug. This local increase of the clearance space between the piston and the end of the cylinder is obtained by forming in the face of the piston, or in the cylinder head, a recess situated adjacent to the orifice of the passageway through the plug member.

By means of the above described improvements as compared with known engines of this type such as that referred to and described in the Patent No. 2,003,311, the following advantages are obtainable. Since a portion only of the total air charge is forced through the constricted passageway through the plug member, less energy is absorbed in forcing air into the external combustion chamber and there is less loss of heat during combustion and expansion, at any rate when the engine is running on higher loads, and the combustion of a considerable portion of the total fuel is completed in that part of the combustion space which lies in the cylinder as distinct from the part which lies external to the cylinder. On light loads nearly the whole of the fuel tends to be burned in the combustion chamber, that is in that part of the combustion space which lies external to the cylinder. Since, however, the air content of this external chamber is only about half the total combustion space, it follows that the temperature of the working fluid within the chamber will be higher, due to the greater fuel to air ratio in the chamber. Hence when the engine is running on light loads, the heat-insulated plug member will tend to attain a higher temperature.

It is well known that high turbulence or intense air swirl, such as is caused to take place in the combustion chamber, increases the difficulty of starting the engine from cold owing to the relatively large heat loss by convection to the containing walls. In the improved construction the air in that part of the combustion space which lies in the cylinder, as distinct from the air in the external combustion chamber, will remain relatively stagnant during the compression stroke and will therefore lose much less heat than the air which has been forced into the external combustion chamber and is there in a state of considerable turbulence.

In order to facilitate starting, means may be provided whereby the whole or a portion of the fuel injected may be temporarily delivered into that part of the combustion space which lies within the cylinder and is separated off by the plug member and passageway therein from the external combustion chamber.

The accompanying drawings illustrate by way of example certain alternative ways in which the improved engine structure may be carried into practice.

In these drawings,

Figure 1 is a sectional elevation through the cylinder, the piston therein and the cylinder head, Figure 2 is a sectional elevation of the piston structure shown in Figure 1, the section being taken on the line 2—2 of Figure 1 looking in the direction of the arrows, Figure 3 is a plan of the face of the same piston and indicating in chain lines the location of the external combustion chamber pocket in relation to the recess formed in the face of the piston, Figure 4 is a sectional elevation of a piston alternatively usable with the cylinder head shown in Figure 1, this piston having a differently formed recess in its face. The figure shows a sectional view of the piston corresponding to the sectional view of the piston in Figure 1.

Figure 5 is a sectional elevation of the piston shown in Figure 4, the section being taken on the line 5—5 looking in the direction of the arrows, Figure 6 is a plan of the face of the piston shown in Figures 4 and 5. In this figure, as in Figure 3, the location of the external combustion chamber pocket is indicated in chain lines.

Figure 7 shows an alternative structure embodying the present improvements, the external combustion chamber pocket in this case being disposed at one side of the cylinder in place of being formed in the cylinder head.

Figure 8 is a plan view of the embodiment illustrated in Figure 7 showing the essential parts of the cylinder casting, the location and outline of the recess in the cylinder head with respect to the external combustion chamber pocket and the cylinder bore being indicated in chain lines, Figure 9 is a sectional elevation showing yet another shape that may be given to the recess when the latter is formed in the face of the piston. In this view the section, in so far as it relates to the piston, is taken on the broken line 9—9 in Figure 10.

Figure 10 is a plan showing the face of the piston and the shape and disposition of the recess formed therein, the location of the external pocket and the orifice at the end of the passageway through the plug leading into this pocket being indicated in chain lines.

Figure 11 is a view similar to Figure 6 illustrating still another embodiment of my invention.

Figure 1:
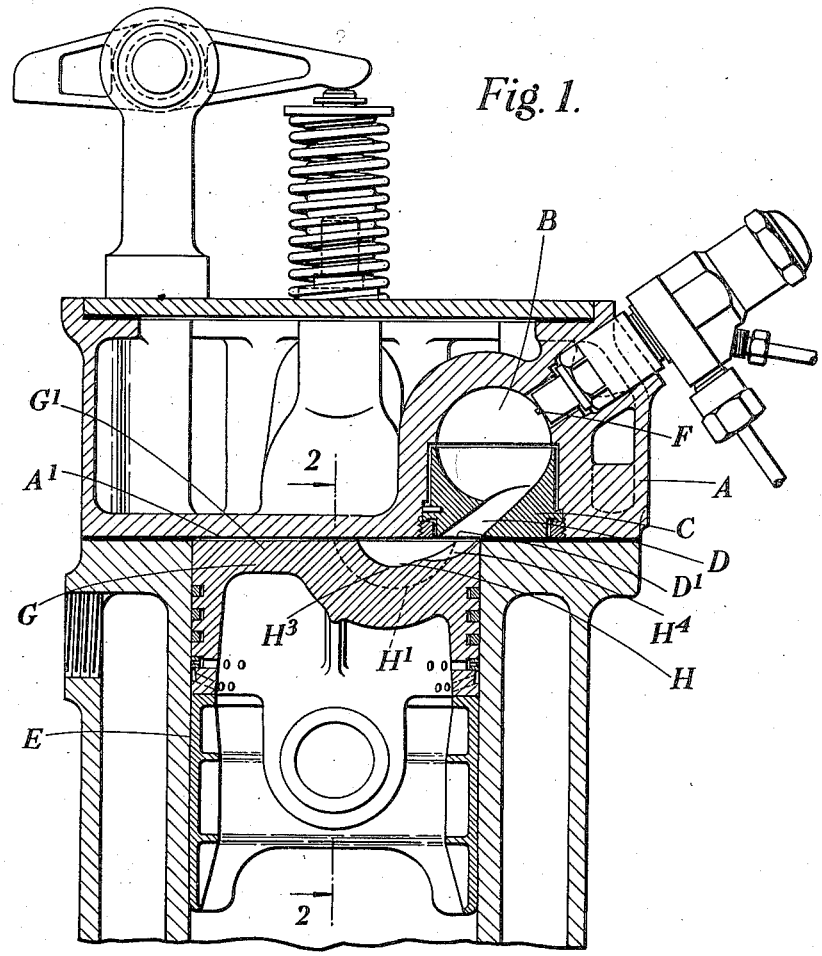
Figure 2:
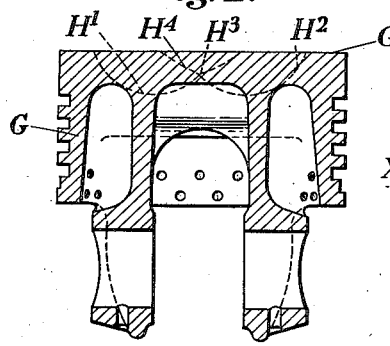
Figure 3:
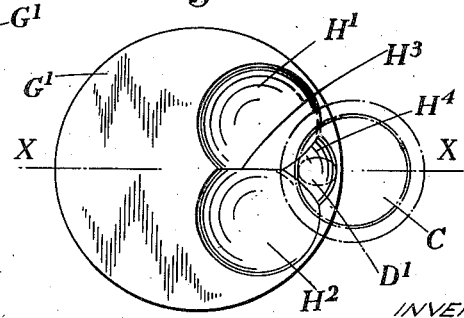

Referring to the structures shown in Figures 1, 2 and 3, the head of the cylinder A is detachable and provided in the construction shown with a flat face $A^1$. In this face, in addition to the inlet and exhaust ports there is an opening forming the mouth of a pocket B constituting a combustion chamber which thus lies external to the cylinder. In the mouth of this pocket lies a plug member C through which runs a passageway D. In all respects material to the present invention the detail construction of the pocket B, the plug C and passageway D therethrough may be for example as described and illustrated in the specification and drawings of the present inventor's Patent No. 2,003,311, referred to above. That is to say, the pocket B may be spherical in shape and the passageway D leads tangentially into the pocket, the orifice $D^1$ at the outer end of this passageway opening into the bore of the cylinder E at one side thereof. It is to be understood, however, that the pocket may have a cylindrical or other shape as found desirable. In any case the plug member C is mounted in the mouth of the pocket B so that there is no free flow of heat from the plug to the cooled adjacent part of the cylinder head. Fuel is injected through a nozzle F into the pocket in such direction and manner as may be desirable.

The piston G is provided with a face $G^1$ which in the construction shown is flat except for that part of this face which lies opposite and adjacent to the orifice $D^1$ of the passageway through the plug member C. In this part of the piston face there is formed a recess H at least a part of which lies directly opposite to the orifice $D^1$ of the passageway D so that after ignition of the charge in the pocket B the gases issuing through the passageway into the cylinder will be directed into the recess H and will pass thence into the main part of the cylinder. At the end of the compression stroke the main part $G^1$ of the piston face approaches the face $A^1$ of the cylinder head as closely as is allowed by mechanical considerations.

It will be seen that in the above described construction the total combustion space available at the end of the compression stroke is divided by the plug member C. One part of this combustion space lies outside the cylinder and is comprised by the pocket B and the passageway D. The other part of the combustion space lies within the cylinder and is comprised by the whole space between the face of the piston and the end of the cylinder, that is to say the clearance between the face $G^1$ of the piston and the face $A^1$ of the cylinder head and the local increase in this clearance constituted by the recess H in the face of the piston. The proportions in which the total piston space is thus divided are such that the volumetric capacity of the part which lies outside the cylinder, that is to say the pocket B and the passageway D, is not more than 50% of the total combustion space.

The part of the combustion space which lies within the cylinder and which comprises not less than 50% of the total combustion space may be formed as in the alternative arrangement shown in Figures 7 and 8 wherein the local increase in the clearance between the piston and cylinder head is obtained by forming a recess in the face of the cylinder head, in place of forming this recess in the face of the piston. In the arrangement shown in Figures 7 and 8 the external combustion chamber pocket B is disposed at one side of the cylinder.

The detail formation of the recess H which constitutes a local increase in the clearance space in the cylinder may vary. For example, it may be smoothly curved with a general ovoid contour in plan and in section, the recess thus having somewhat the appearance of one-half of an egg whose ends, however, are substantially similar in contour, the division being effected in the direction of the major axis. With such a recess the gases issuing from the passageway D are directed into the recess from one side thereof, that is to say, substantially along the minor axis of the ovoid figure. These gases, after impinging against the opposite side of the recess, will there be deflected and will flow away on either hand, that is to say oppositely, but generally in the direction of the major axis of the recess and over the face of the piston. Preferably, however, this recess is shaped so that the gases issuing from the passageway D into the recess will tend to be split into two portions, either approximately similar or otherwise, and each portion will tend to have imparted to it in the recess an organized rotary motion as these gases pass through the recess into the main part of the cylinder. The piston structure illustrated by way of example in Figures 1, 2 and 3 shows such a formation of the recess H as will tend to produce this effect on the gases.

Referring to Figure 3, it will be there seen that the recess comprises two depressions $H^1$ and $H^2$ in this case shown as similar. Each of these depressions is shaped as a similar portion of a sphere, as will be apparent by reference to Figures 1 and 2 wherein the contours of the depressions are indicated in chain lines. The two depressions merge together in a rib or ridge $H^3$ which extends part way along and in the median plane X—X which defines the centre line of the recess. There is also in the recess a third and smaller depression H⁴ which is also shaped as part of a sphere and into which open the depressions H¹ and H², this depression H⁴ being disposed laterally, as shown in Figure 3, with respect to the major depressions H¹ and H² and where it will be cut by the median line X—X. Thus, as will be seen from the drawings, the two major depressions H¹ and H² in this case are situated symmetrically with respect to each other and to the lesser depression H⁴ on either side of the median plane X—X within which there runs the rib or ridge H³. As will be seen in Figure 3, the median plane X—X in this case contains the axis of the cylinder E and the piston G and it also passes through the centre of the external combustion chamber or pocket B when, as here shown, the latter is spherical. This plane will contain the axis of the chamber B if the latter is wholly or partly cylindrical. This plane will then also pass through the centre of the orifice D¹ of the passageway D through the plug C and will divide this passageway symmetrically in the direction of its length.

The appearance of the recess as viewed in plan in Figure 3 will be seen to have some resemblance to the figure 8 the two portions of which are formed by parts of similar circles, which constitute the boundaries of the depressions H¹ and H². These circles cut and have their centres equidistant from the median plane X—X, which thus forms a common chord with respect to these circles, this chord constituting the "waist" of the figure 8. The lesser depression H⁴ appears as part of a circle struck from a centre in the median plane X—X and giving the appearance of a bulge on one side of the "waist" of the figure 8.

Such a formation of the recess and its disposition on the one hand with respect to the bore of the cylinder E and on the other hand in relation to the contour of the external chamber B and the shape and disposition of the passageway D through the plug C, when all these parts are viewed in plan, will show a symmetrical arrangement of all these parts about the median plane X—X which contains the axis of the cylinder E, the centre line of the recess H and the centre or axis of the external chamber B.

With the recess thus shaped, when ignition of the charge occurs in the external chamber B, the flame as it issues from the passageway D will tend to be split into two approximately similar portions by the ridge H³ along the centre line of the recess, and in the part-spherical main depressions H¹ and H² in the recess the gases will tend to have given to them an organized rotary motion.

It is to be noted that in some cases it may be desirable or convenient to form the recess unsymmetrical or to dispose it otherwise than symmetrically with respect to the plane in which lies the axis of the cylinder and piston.

Figures 4, 5 and 6 illustrate an alternative formation of the recess that may be adopted, being here shown as disposed in the face of the piston. In this case, as will be seen more particularly in Figure 6, the recess H has a somewhat triangular appearance in plan. The triangle is approximately equally angular and well rounded at the angles. One angle of the triangle lies over or adjacent to the centre of the piston face G¹ while the side opposite to this angle is bulged outwards so that it extends to or adjacent to the periphery of the piston. This bulged portion, as will clearly be seen in Figure 6, will lie opposite to the orifice D¹ of the passageway through the plug C, the positions of this orifice and the plug in the head of the cylinder being indicated in the figure in chain lines. As seen in the sectional elevations of the piston shown in Figures 4 and 5, the recess H there appears as a shallow cup-like, and in this instance flat-bottomed, depression in the face of the piston, the bottom being smoothly curved upwards at its sides to the margin of the recess in the face of the piston. A similarly shaped recess may be provided in the cylinder head if the external chamber pocket is arranged at the side of the cylinder and not in the head.

In Figure 11 there is shown such a substantially half egg contour as may be alternatively given to the recess referred to above. The line H˟ cuts off, as it were, the apex of the somewhat triangular form of the recess as shown in Figure 6 and thus gives to the recess a general ovoid appearance in plan except for the outward bulge at that side which is adjacent to the periphery of the piston and lies opposite to the orifice D¹ of the passageway D. With such modified ovoid formation of the recess the floor thereof may be somewhat flattened or may be contoured similarly to the side of the recess as indicated by the line H˟. The gases issuing from the passageway will flow in the direction of the minor axis of the recess and will impinge against the side thereof indicated by the line H˟ where these gases will be deflected in both directions towards the end of the ovoid figure, passing thence over the face of the piston.

In Figures 7 and 8 is shown an alternative structure wherein the external pocket-like chamber B, constituting a part of the combustion space, is formed and arranged in the casting at one side of the cylinder E. The detail structure of the pocket B, as also of the plug C and the passageway D therethrough, may be as found desirable and for example as described and illustrated in the specification and drawings of the above mentioned Patent No. 2,003,311. As seen in the plan, Figure 8, the mouth of the pocket B and the end of the cylinder E lie side by side and spaced a short distance apart, the cylinder casting being arranged to provide for the circulation of cooling fluid about the external pocket B. The plug C is located in the mouth of the pocket B about the axis of the plug so that the axis of the passageway D through the plug is directed towards and if prolonged will meet the axis of the cylinder E.

The cylinder head A has formed therein the inlet and exhaust ports. There is also formed in the face of the head the recess H which constitutes nearly the whole of that part of the combustion space which lies in the cylinder and is available at the end of the compression stroke and into which recess pass the gases issuing from the passageway D after ignition of the charge in the chamber B.

The recess H in the head of the cylinder in the construction shown in Figures 7 and 8 has a form similar to that of the recess H in the head of the piston as described above and shown in Figures 1, 2 and 3 of the drawings. That is to say, the recess comprises two similar and part-spherical depressions H¹ and H² and a third and lesser depression H⁴, also conveniently part-spherical, all these depressions being disposed symmetrically, as seen in the plan in Figure 8, with respect to the median plane X—X in which lies the axis of the cylinder E. The lesser depression $H^4$ at one side of the recess lies opposite to the orifice $D^1$ of the passageway D, while portions of the depressions $H^1$ and $H^2$ overlap the bore of the cylinder E and thus lie opposite to a part of the face $G^1$ of the piston. The relative positions of these parts are clearly shown in Figure 8. With this arrangement at the end of the compression stroke not more than 50% of the combustion space then occupied by the compressed charge is comprised by the volumetric content of the chamber B and the passageway D, while the balance of this combustion space is comprised as to a small portion thereof by the clearance between the face $A^1$ of the cylinder head and the face $G^1$ of the piston and as to the greater part of this balance by the local increase of the clearance constituted by the recess H. When the fuel has been injected into the chamber B and the charge ignited therein, the gases issuing through the passageway D will pass first into the lesser depression $H^4$ and then tend to be split by the slight rib $H^3$ between the major depressions $H^1$ and $H^2$ wherein the divided gases will tend to be given rotational movements but in opposite directions. The gases will flow thence from the whole recess H into the main part of the end of the cylinder. In this case also, if found desirable the shaping and positioning of the recess may be asymmetrical.

Referring to Figures 9 and 10, there is there shown another shape that may be given to the recess H when this is formed in the face of the piston and the external pocket B is disposed in the cylinder head. In this case the recess comprises two major depressions $H^5$ and $H^6$ each of which has the appearance of a shallow circular cup preferably with a flat bottom the edge portion of which curves smoothly up to a circular margin in the piston face. These depressions $H^5$ and $H^6$ are disposed in the face $G^1$ of the piston and for example, in the construction illustrated, symmetrically on either side of the median plane X—X in which lies the axis of the piston so that the centres of these depressions in this case lie equi-distant from this median plane, as will be seen in Figure 10, and on a line which passes through and is normal to this plane. Such a symmetrical formation and arrangement is not however a necessity. The two shallow depressions $H^5$, $H^6$ merge or open into the opposite sides of one end of a trench-like depression $H^7$. The trench $H^7$ projects laterally, as the whole recess is viewed in plan in Figure 10, and terminates near the periphery of the piston G. The outer end portion of the trench $H^7$ lies opposite to the orifice $D^1$ of the passageway leading through the plug C from the chamber B. The positions of this orifice $D^1$ and plug C are indicated in chain lines in Figure 10. After ignition of the charge in the chamber B, the gases as they issue from the orifice $D^1$ will pass into and along the trench $H^7$ and will tend to be split by the mid rib $H^8$ formed where the cup-like depressions $H^5$ and $H^6$ begin to merge. The gases thus divided will be directed into these two depressions wherein these gases will tend to rotate in opposite directions. The bottom of the trench may be inclined with respect to a plane normal to the axis of the piston so as to slope down to its junction with the two cup-like depressions.

With this formation of the whole recess the cup-like depressions $H^5$, $H^6$ therein may be dimensioned as to their diameters and located in the face $G^1$ of the piston, as shown in Figures 9 and 10, so that the depressions will respectively lie opposite or approximately opposite to the inlet and exhaust ports in the cylinder head when the latter is in place. Such a formation and disposition of the recess obviates any need to set back or sink slightly the valve seats into the head, as may be otherwise necessary, so as to allow clearance for the valve heads with respect to the face of the piston. In cases where some setting back of the valve seats is considered desirable the additional clearance space thus provided by the setting back merely forms in effect a part of the cup-like depressions, that is to say it has the effect of increasing the volumetric content of the recess considered as a whole.

If the recess is formed or arranged with respect to the valves otherwise than as just described above, a setting back of the valve seats may be called for, but would then be rather disadvantageous as it involves a slight increase in the clearance between those portions of the head and of the piston face which it is desirable shall approach each other as closely as practicable at the end of the compression stroke in order to cause as much of the air charge as is practicable to pass into the external chamber B, the passageway D, and the recess which constitutes a local increase of this clearance space.

It will be apparent from Figure 10 that the modified form of the recess as there shown in plan, still has somewhat the appearance of a figure 8, but with the trench-like depression $H^7$ seen as a lateral projection extending from the "waist" of the figure and in a direction which may be at right angles to a line extending between the centres of the flat-bottomed circular depressions $H^5$, $H^6$. The trench-like projection is preferably smoothly curved at its sides and outer end. The outer end of the trench as seen in plan is also conveniently rounded in the plane of the face of the piston. The shape and dimensions of the trench and more especially of its outer end part may be determined, at least to some extent, by the shape and dimensions of the passageway orifice $D^1$. Not only may be depth of the trench vary throughout the whole or part of its length, but its width also may vary.

A recess formed as shown in Figures 9 and 10 and as described above may be provided in the face of the head when the chamber B is arranged at the side of the cylinder as shown in Figure 7.

What I claim as my invention and desire to secure by Letters Patent is:—

1. An internal combustion engine of the type indicated comprising in combination a cylinder, a detachable head for the cylinder, a piston in the cylinder, the opposed faces of the head and piston adapted to be disposed closely together at the end of the compression stroke of the piston thereby reducing the clearance between them so far as is permitted by mechanical considerations, a pocket-like combustion chamber formed and disposed externally of the cylinder and opening toward the same, a plug member arranged in the mouth of said chamber and having a passageway therethrough, said passageway terminating in an orifice, a fuel jet device disposed in said chamber for delivering a charge of fuel towards a point in the wall of said chamber, a recess formed in one of the said opposed faces, said recess being open to the cylinder bore and at least a part of the recess adapted to lie opposite to said orifice at least at the end of the compression stroke, the recess comprising two depressions with a rib-like projection between them adapted to split the stream of gases entering the recess from the said passageway after ignition of the charge in the said pocket-like chamber, said recess constituting a local increase in the otherwise reduced clearance between the piston and cylinder head, the total combustion space available at the end of the compression stroke being comprised by the volumetric content of the external chamber, the passageway through the plug, the recess and the remainder of the clearance between the face of the piston and the end of the cylinder, of which total combustion space not more than 50% nor less than 30% is in the external chamber and the said passageway.

2. An internal combustion engine of the type indicated comprising in combination a cylinder, a detachable head for the cylinder, a piston in the cylinder, the opposed faces of the head and piston approaching each other closely at the end of the compression stroke of the piston thereby reducing the clearance between them so far as is permitted by mechanical considerations, a pocket-like combustion chamber formed in the cylinder block at the side of the cylinder, a plug member arranged in the mouth of this pocket through which plug runs a passageway, a recess formed in the head of the cylinder and positioned where a part of the recess will lie opposite to the orifice of the said passageway through the plug member while another part of the recess will be open to the cylinder bore, the recess comprising therein two major depressions with a rib-like projection between them and a lesser depression in that part of the recess which lies opposite to the orifice of the said passageway whereby the stream of gases issuing from the passageway after ignition of the charge in the said external chamber and entering the lesser depression in the recess is split by the said rib-like projection as it passes into the major depressions in the recess whence these gases pass into the bore of the cylinder, the whole recess constituting a local increase in the otherwise reduced clearance between the piston and cylinder head, the total combustion space available at the end of the compression stroke being comprised by the volumetric content of the external chamber, the passageway through the plug, the recess and the remainder of the clearance between the face of the piston and the end of the cylinder of which total combustion space not more than 50% is in the external chamber and the said passageway.

3. An internal combustion engine of the type indicated comprising in combination a cylinder, a detachable head for the cylinder, a piston in the cylinder, the opposed faces of the head and piston adapted to lie closely together at the end of the compression stroke of the piston thereby reducing the clearance between them so far as is permitted by mechanical considerations, a pocket-like combustion chamber formed and disposed externally of the cylinder, a plug member arranged in the mouth of the pocket-like chamber and having a passageway therethrough, a recess formed in one of the said opposed faces, said recess being open to the cylinder bore and a part thereof adapted to lie opposite to the orifice of the said passageway through the plug member at the end of the compression stroke, said recess comprising two cup-like depressions and a trench-like depression opening at one end into the cup-like depressions, the latter where they merge forming a rib-like projection between them, that part of the whole recess constituted by the trench-like depression lying opposite to the orifice of the said passageway, whereby the stream of gases issuing from the passageway after ignition of the charge in the said external chamber and entering the trench-like depression in the recess is split by the said rib-like projection as it passes into the cup-like depressions in the recess whence these gases pass into the bore of the cylinder, the whole recess constituting a local increase in the otherwise reduced clearance between the piston and cylinder head, the total combustion space available at the end of the compression stroke being comprised by the volumetric content of the external chamber, the passageway through the plug, the recess and the remainder of the clearance between the face of the piston and the end of the cylinder, of which total combustion space not more than 50% is in the external chamber and the said passageway.

4. An internal combustion engine of the type indicated comprising in combination a cylinder, a detachable head for the cylinder having seats for the inlet and exhaust valves formed in openings in the face of this head, a piston in the cylinder, the opposed faces of the head and piston adapted to lie closely together at the end of the compression stroke of the piston thereby reducing the clearance between them so far as is permitted by mechanical considerations, a pocket-like combustion chamber formed in the cylinder head externally of the cylinder, a plug member disposed in the mouth of this chamber and having a passageway therethrough opening into the end of the cylinder, a recess formed in the face of the piston, the recess comprising two larger cup-like depressions and a lesser depression, the two larger depressions merging into each other and opening into the lesser depression with a rib-like projection formed where the two larger depressions merge into each other, the recess being situated in the face of the piston, whereby when the head is in place on the end of the cylinder the larger depressions will lie opposite to the valve seats in the cylinder head and the lesser depression will lie opposite to the orifice of the passageway through the said plug at the end of the compression stroke, whereby the stream of gases issuing from the passageway after ignition of the charge in the said external chamber and entering the lesser depression in the recess is split by the said rib-like projection as it passes into the larger depressions whence these gases pass into the bore of the cylinder, the whole recess constituting a local increase in the otherwise reduced clearance between the piston and cylinder head, the total combustion space available at the end of the compression stroke being comprised by the volumetric content of the external chamber, the passageway through the plug, the recess and the remainder of the clearance between the face of the piston and the end of the cylinder, of which total combustion space not more than 50% is in the external chamber and the said passageway.

HARRY RALPH RICARDO.